(12) United States Patent
Mulvihill

(10) Patent No.: US 7,434,859 B2
(45) Date of Patent: Oct. 14, 2008

(54) NESTING CONSOLE SYSTEM

(75) Inventor: James Mulvihill, Berkley, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 253 days.

(21) Appl. No.: 11/164,073

(22) Filed: Nov. 9, 2005

(65) Prior Publication Data

US 2007/0102945 A1    May 10, 2007

(51) Int. Cl.
*B60R 7/04* (2006.01)
(52) U.S. Cl. ............ 296/24.34; 296/37.8; 224/400
(58) Field of Classification Search ......... 296/24.34, 296/37.8, 1.09; 224/400
See application file for complete search history.

(56) References Cited

U.S. PATENT DOCUMENTS

| | | | |
|---|---|---|---|
| 6,719,343 | B2 | 4/2004 | Emerling et al. |
| 6,726,267 | B2 | 4/2004 | Kim et al. |
| 6,921,118 | B2 | 7/2005 | Clark et al. |
| 7,140,660 | B2 * | 11/2006 | Oana .................... 296/37.8 |
| 2003/0155787 | A1 | 8/2003 | Lein et al. |

* cited by examiner

*Primary Examiner*—H Gutman
*Assistant Examiner*—Melissa A Black
(74) *Attorney, Agent, or Firm*—Earl LaFontaine

(57) ABSTRACT

A console for a vehicle includes a console housing defining a storage compartment. The console housing also defines an indented area in an outer surface thereof. A bin is sized to fit within the indented area such that an entire internal surface area of the bin is contiguous with the indented area when the bin is closed.

15 Claims, 3 Drawing Sheets

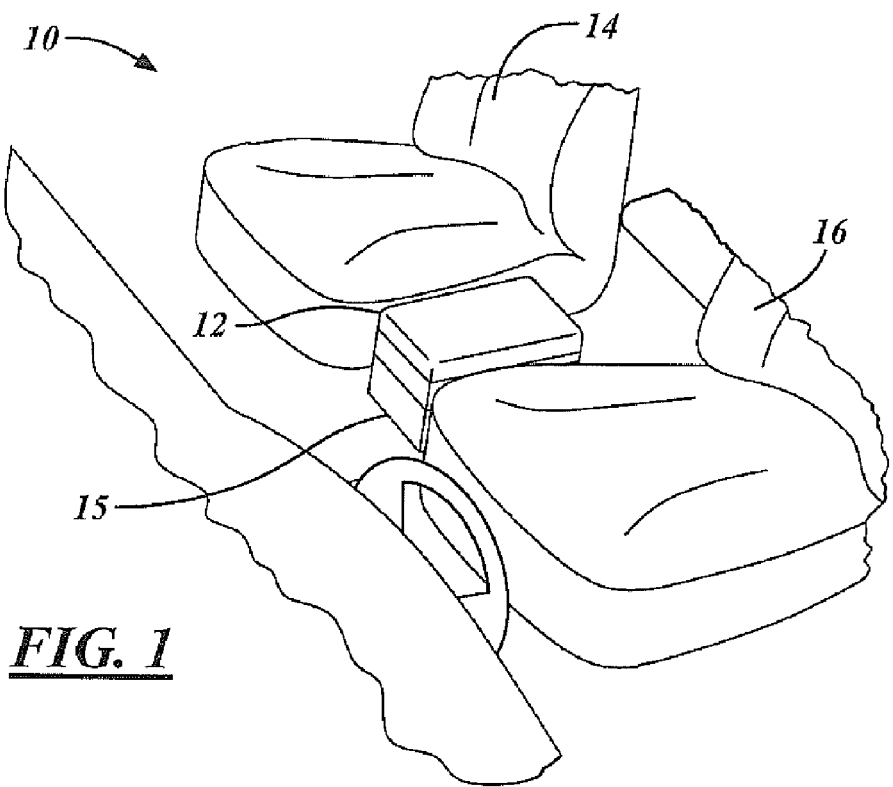
FIG. 1
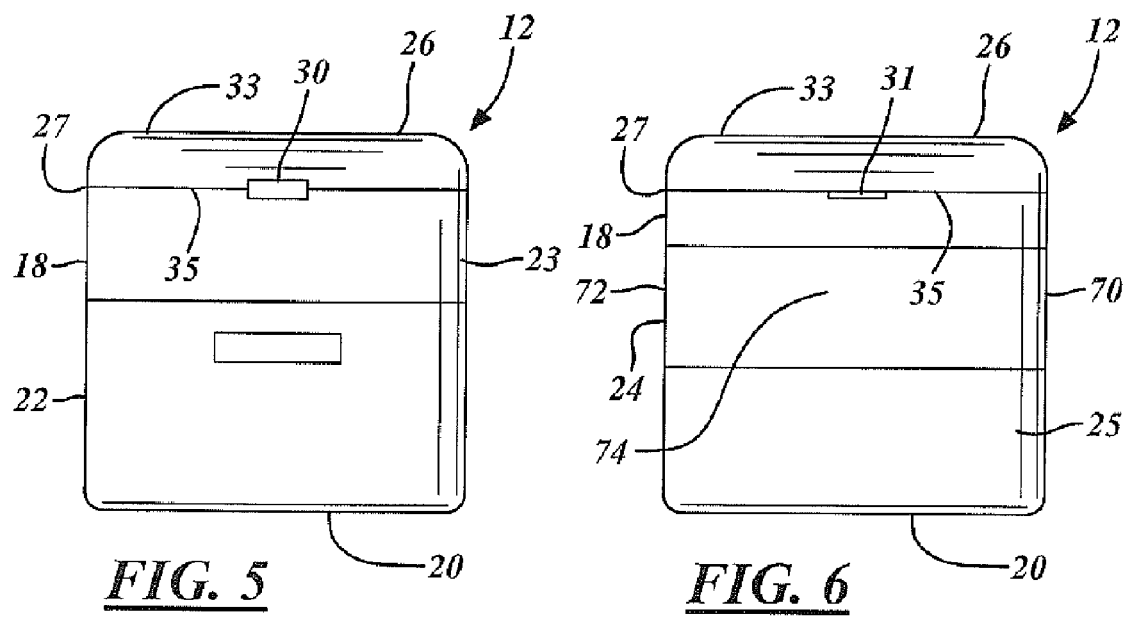
FIG. 5
FIG. 6

NESTING CONSOLE SYSTEM

TECHNICAL FIELD

The present invention relates generally to vehicle consoles and, more specifically, to a nesting console system.

BACKGROUND OF THE INVENTION

Many automotive vehicles include a center console or other storage device disposed between driver and passenger seats in front and rear passenger compartments. These consoles typically include a console base either secured to the floor or pivotally connected between the seats, a storage cavity formed in the console base to retain items during travel, and an armrest pivotally connected to the console base extending generally horizontally across the storage cavity.

It is a constant goal for automotive design to maximize console interior volume while providing multiple features including trash bins and storage bins. However, console features, such as trash bins and storage bins, generally occupy additional space either in the console or adjacent thereto.

It would therefore be desirable to design a console including bins that, when stowed, do not occupy a substantial amount of interior space of a center console. The present invention is directed to these ends.

SUMMARY OF THE INVENTION

The disadvantages of the related art are overcome by the system.

In accordance with one embodiment of the present invention, a console system for use with a passenger compartment of a vehicle includes a console housing, defining a storage compartment, for installation in the passenger compartment. The console housing also defines a first indented area in an outer surface thereof. A front bin is sized to fit within the indented area such that an entire internal surface area of the front bin is contiguous with the first indented area when the front bin is closed.

Other objects, features and advantages of the present invention will be readily appreciated, as the same becomes better understood after reading the subsequent description taken in connection with the accompanying drawings. The present invention itself, together with further objects and attendant advantages, will be best understood by reference to the following detailed description, taken in conjunction with the accompanying drawings.

BRIEF DESCRIPTION OF THE DRAWINGS

For a more complete understanding of this invention reference should now be had to the embodiments illustrated in greater detail in the accompanying figures and described below by way of examples of the invention wherein:

FIG. 1 is a perspective view of a vehicle in accordance with one embodiment of the present invention.

FIG. 5 is a front view of the console system of FIG. 4 having closed bins in accordance with another embodiment of the present invention.

FIG. 6 is a rear view of the console system of FIG. 4 having closed bins in accordance with another embodiment of the present invention.

DETAILED DESCRIPTION

Figure 2:
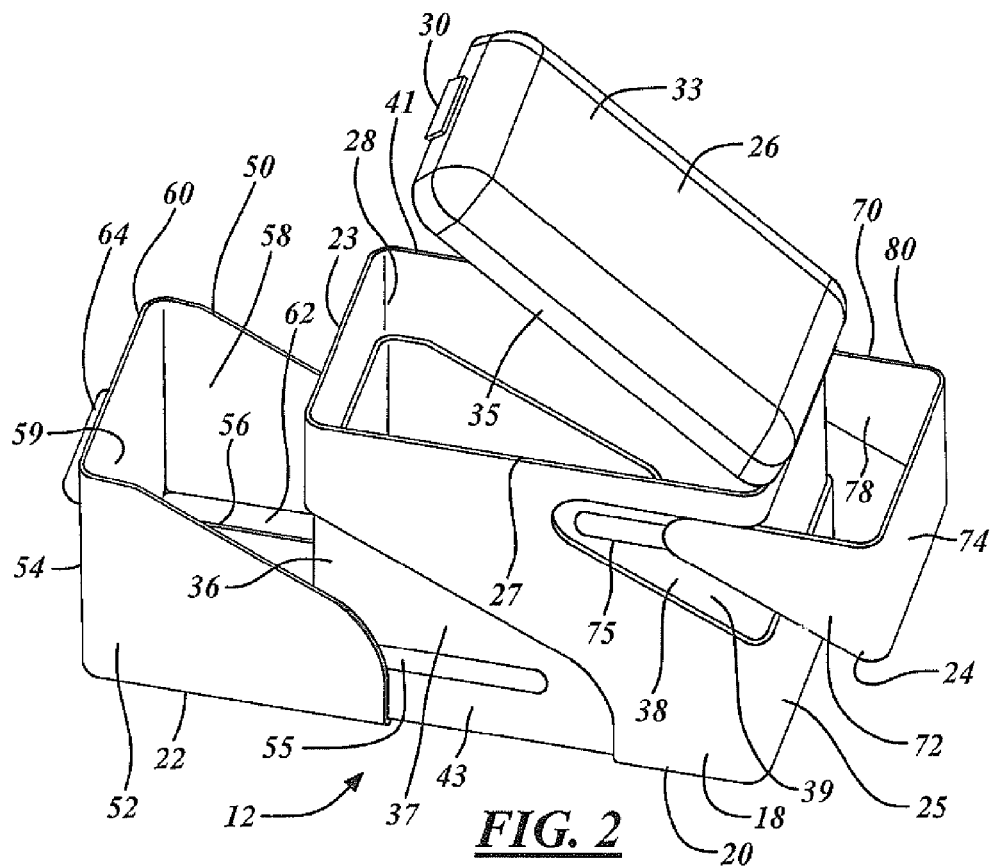
FIG. 2 is a perspective view of a console system having open bins in accordance with another embodiment of the present invention.

While the present invention is described primarily with respect to a vehicle console system, the present invention may be adapted to various applications requiring consoles, as will be understood by one skilled in the art.

In the following description, various operating parameters and components are described for a number of constructed embodiments. The specific parameters and components are included as examples and are not meant to be limiting.

Referring now to the drawings, like numerals are used to designate like structures throughout the figures. Referring to FIG. 1, a perspective view of a vehicle 10 including a console system 12 is illustrated in accordance with one embodiment of the present invention. The console system 12 is illustrated positioned on the vehicle floor 15 between the driver and passenger seats 14, 16 in the front passenger compartment of the vehicle 10. However, it is understood that the console system may also be positioned between a split passenger seat arrangement in the rear passenger compartment of the vehicle. Further, the console system 12 may be included between or coupled to rear seats and may fold out or rise out of any portion of any vehicle seat, as will be understood by one skilled in the art.

Figure 3:
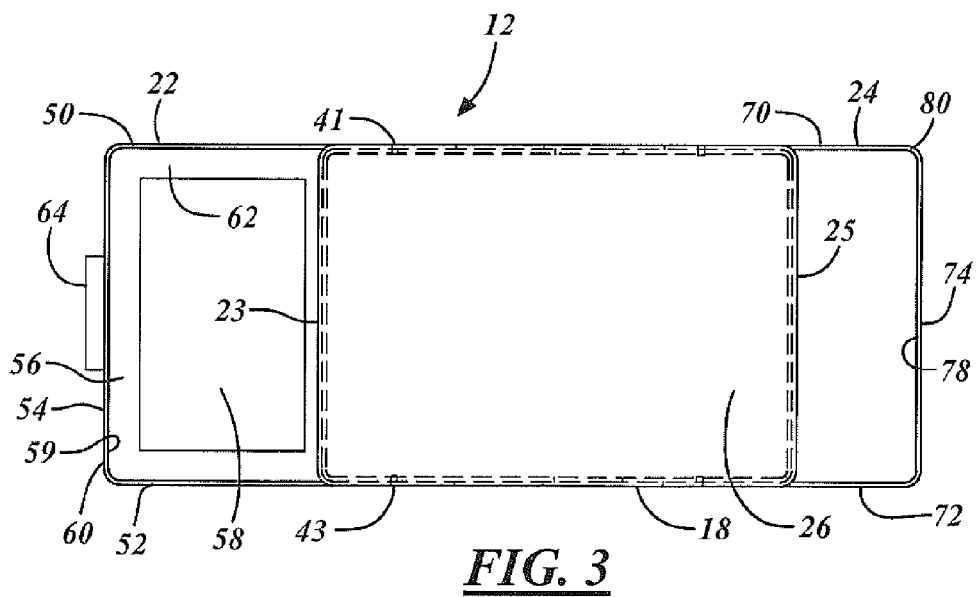
FIG. 3 is a top view of the system of FIG. 2 having open bins in accordance with another embodiment of the present invention.
Figure 4:
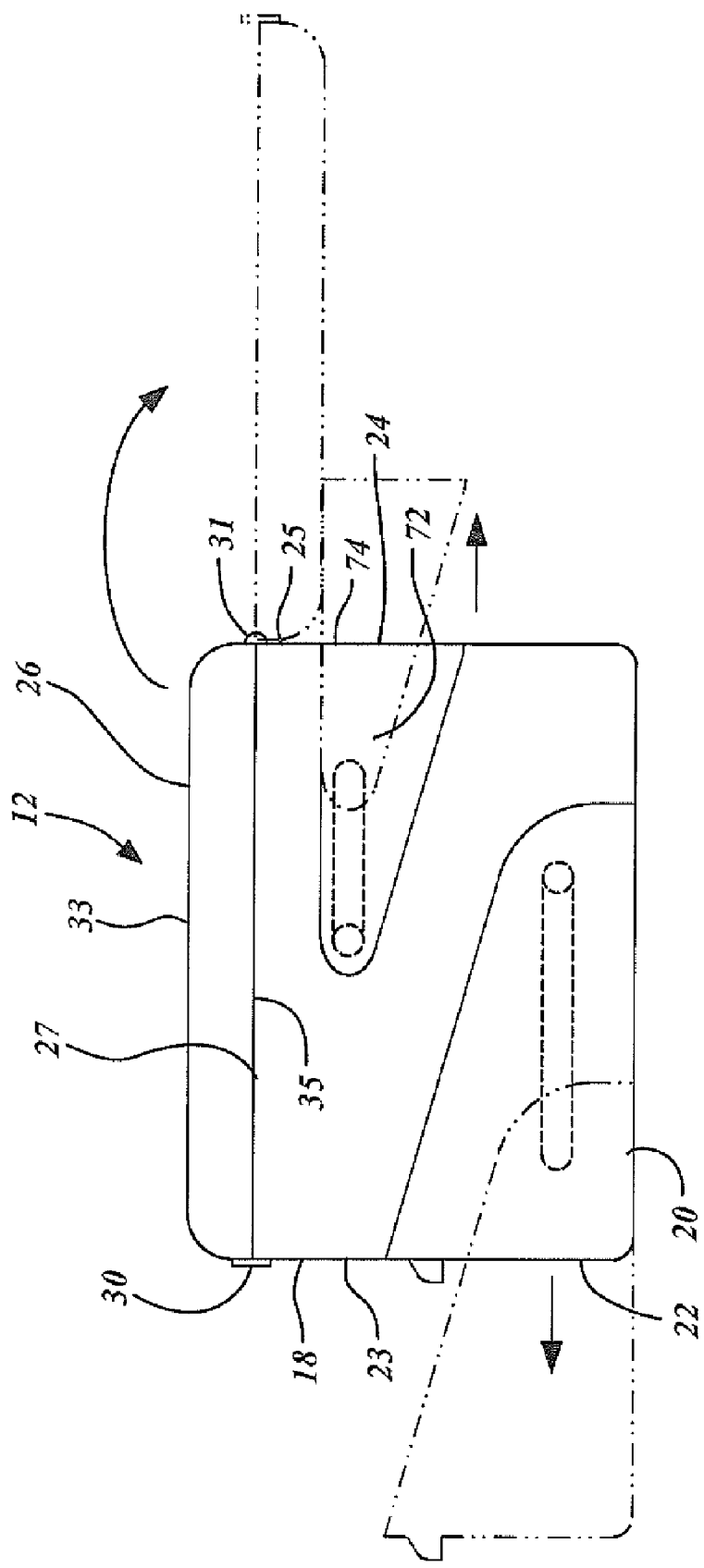
FIG. 4 is a side view of the console system of FIG. 3 having closed bins and illustrating positions of the bins in an opened position in accordance with another embodiment of the present invention.

Referring now to FIGS. 2-6, a console system 12 for a vehicle in accordance with the present invention is illustrated. The console system includes a console housing 18 having a base 20 configured to secure the console system 12 to the floor of the passenger compartment of the vehicle.

The console housing 18 may also include a variety of accessory components (e.g. front bin 22 and rear bin 24 respectively discussed in detail later), such as storage bins, cup holders, trash bins, or openings for holding trash bags, on the forward or rear portions 23, 25 (forward and rear sides) of the housing 18.

The console housing 18 also includes an upper portion 27 for receiving items in a storage compartment 28 defined within the housing 18. An armrest 26 (closeout section) is connected by a hinge 31 to the upper portion 27 for covering the storage compartment 28. The armrest 26 includes a top surface 33 and a bottom surface 35. The armrest 26 and closeout section 28 are secured together by an armrest latch 30.

The forward portion 23 of the console system 12 includes a first indented area 36 receiving the front bin 22 such that when closed, the front bin 22 is flush with the forward portion 23. The first indented area 36 is ideally sized to correspond with the shape and size of the front bin 22. Further, the indented area 36 includes a flat surface 37 and generally does not provide an opening extending into the storage compartment 28. The first indented area 36 is also defined extending across the forward portion 23, down a left side 41, and down a right side 43 of the housing 18.

The front bin 22 is generally a sleeve sized to fit around and recessed within the first indented area 36. The front bin 22 includes a front bin left side 50, a front bin right side 52, a front bin front side 54, a front bin bottom side 56, a front bin interior 58, and a front bin common edge 60. The front bin 22 is illustrated in an open position in FIGS. 2 and 3 and illustrated in a closed position in FIGS. 4-6.

The left side 50 and the right side 52 are generally parallel and extend away from and are tapered relative to the front side 54. The sides 50, 52 may slide along tracks 55 for fitting into the indented area 36. Important to note is that the sides 50, 52 may slide along any known mechanism for opening and closing drawers, as will be understood by one skilled in the art.

The bottom side 56 includes a flange 62 extending inwardly from the left, right, and front sides 50, 52, 54 rather than a completed surface. Important to note is that alternate embodiments include a completed surface or no surface at all (e.g. no flange). The bottom side 56 is designed to receive, among other things, a garbage bag or to act as a cup holder. The bottom side 56 or the entire front bin 22 may also receive interchangeable modules.

The front side 54 includes a handle 64 for opening and closing the front bin 22. The front side 54 is generally flush with the armrest 26 and the forward portion 23 of the console system 12 when the front bin 22 is closed. Although embodied with a handle, alternate embodiments include other known systems for opening and closing a drawer, as will be understood by one skilled in the art.

The interior 58 of the front bin 22 is designed such that, when closed, the surface thereof (front bin internal surface or surface area 59) is contiguous with the surface of the first indented area 36 (contiguous herein defined as either in contact with or in close proximity thereto). The interior 58 is defined by the interior surfaces of the left side 50, the right side 52, the front side 54, and the bottom side 56.

The common edge 60 is substantially uniform throughout the front bin 22 and is generally thin such that the first indented area 36 may receive the front bin 22 flushly therein.

The rear portion 25 of the console system 12 includes a second indented area 38 receiving the rear bin 24 such that when closed, the rear bin 24 is flush with the rear portion 25. The indented area 38 is ideally sized to correspond with the shape and size of the rear bin 24. Further, the indented area 38 includes a flat surface 39 and generally does not provide an opening extending into the storage compartment 28. The second indented area 38 is also defined extending across the rear portion 25, partially extending down the left side 41, and partially extending down the right side 43 of the housing 18.

The rear bin 24 is generally a sleeve sized to fit within the second indented area 38. The rear bin 24 includes a rear bin left side 70, a rear bin right side 72, a rear bin back side 74, a rear bin interior 78, and a rear bin common edge 80. The rear bin 24 is illustrated in an open position in FIGS. 2 and 3 and illustrated in a closed position in FIGS. 4-6.

The left side 70 and the right side 72 are generally parallel and extend away from and are tapered relative to the back side 74. The sides 70, 72 may slide along tracks 75 for fitting into the second indented area 38. Important to note is that the sides 70, 72 may slide along any known mechanism for opening and closing drawers, as will be understood by one skilled in the art.

The rear bin 24 is not illustrated including a bottom side, however, alternate embodiments include a completed surface, a flange, or no surface at all. The rear bin 24 is designed to receive, among other things, a garbage bag or to act as a cup holder. The rear bin 24 may also receive interchangeable modules.

The back side 74 is generally flush with the armrest 26 and the rear portion 25 of the console system 12 when the rear bin 24 is closed.

The interior 78 of the rear bin 24 is designed such that, when closed, the surface thereof either contacts the surface of the second indented area 38 or is in close proximity thereto.

The interior 78 is defined by the interior surfaces of the left side 70, the right side 72, and the back side 54.

The common edge 80 is substantially uniform throughout the rear bin 24 and is generally thin such that the second indented area 38 may receive the rear bin 24 flushly therein.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A console system for use with a passenger compartment of a vehicle comprising:
    a console housing adapted to be installed in the passenger compartment and defining a storage compartment,
    said storage compartment comprising an outer surface having a front face, two side faces, and a first indented area formed in said outer surface
    a front bin comprising an external sleeve configured to sit within said first indented area such that the entire external sleeve is positioned externally to said outer surface at all times and said external sleeve exterior forms a contiguous outer surface of said console housing when said front bin is closed, said front bin not penetrating said outer surface when said front bin is closed;
    wherein said external sleeve may be slid forward to form a storage sleeve.

2. The console system of claim 1, wherein said console housing further defining a second indented area in an outer surface thereof, the system further comprising a rear bin generally sized to fit within said second indented area, said rear bin comprising a left side, a right side, a back side, an interior, and a common edge.

3. The console system of claim 2, wherein said interior of said rear bin is shaped such that, when closed, a surface of said interior contiguous with a surface of said second indented area, said surface of said interior comprises interior surfaces of said left side, said right side, and said back side.

4. The console system of claim 2, wherein said common edge is substantially uniform throughout said rear bin and is generally thin such that said second indented area receives said rear bin flushly therein.

5. The console system of claim 1 further comprising a closeout section pivotally connected to said console housing and positionable between a raised position and a lowered position wherein a bottom surface of said closeout section at least partially covers said storage compartment.

6. The console system of claim 1, wherein said first indented area comprises a continuous surface.

7. The console system of claim 1, wherein said front bin comprises a left side, a right side, a front side, a bottom side, an interior, and a common edge, whereby said left side and said right side are generally parallel and extend away from and are tapered relative to said front side.

8. The console system of claim 7, wherein said left side and said right side slide along tracks on said console housing when fitting said front bin into said indented area.

9. The console system of claim 7, wherein said bottom side comprises a flange extending inwardly from said left side, said right side, and said front side.

10. A console system for use with a passenger compartment of a vehicle comprising:
    a console housing adapted to be installed in the passenger compartment and defining a storage compartment, said console housing comprising a forward portion, a rear portion, an upper portion, a base, a left side, and a right side, said console housing defining a first indented area extending across said forward portion and extending at least partially down a length of said left side, and said right side;

an armrest hingeably coupled to said console housing and positionable between a raised position and a lowered position, wherein a bottom surface of said armrest at least partially covers said storage compartment, when said armrest is in said lowered position; and a front bin comprising an external sleeve configured to sit within said first indented area such that said entire external sleeve is positioned externally to said outer surface at all times and said external sleeve exterior forms a contiguous outer surface of said console housing when said front bin is closed, said front bin comprising a front bin left side, a front bin right side, a front bin front side, a front bin bottom side, a front bin interior, and a substantially uniform front bin common edge, whereby said front bin left side and said front bin right side are generally parallel and extend away from said front bin front side, whereby said forward portion, said left side, said right side, and said front bin form a generally flush surface when said front bin is closed;

said front bin bottom side comprising a flange extending inwardly from said front bin left side, said front bin right side, and said front bin front side, wherein said external sleeve may be slid forward to form a storage sleeve.

11. The console system of claim 10, wherein said console housing further defining a second indented area extending across said rear portion and extending at least partially down a length of said left side, and said right side, the system further comprising a rear bin generally sized to fit within said second indented area, said rear bin comprising a rear bin left side, a rear bin right side, a rear bin back side, a rear bin interior, and a substantially uniform rear bin common edge.

12. The console system of claim 11, wherein said interior of said rear bin is shaped such that, when closed, an entire surface of said interior of said rear bin is contiguous with a surface of said second indented area, said surface of said interior comprises interior surfaces of said rear bin left side, said rear bin right side, and said rear bin back side, wherein said rear bin common edge is generally thin such that said second indented area receives said rear bin flushly therein.

13. The console system of claim 12, wherein said rear bin left side and said rear bin right side are generally tapered relative to said rear side.

14. The console system of claim 12, wherein said rear bin left side and said rear bin right side slide along tracks on said console housing when fitting said rear bin into said second indented area.

15. A console system coupled between two vehicle seats in a passenger compartment of a vehicle comprising:

a console housing defining a storage compartment, said console housing comprising a forward portion, a rear portion, an upper portion, a base, a left side, and a right side, said console housing defining a first indented area extending across said forward portion and extending at least partially down a length of said left side, and said right side, said console housing further defining a second indented area extending across said rear portion and extending at least partially down a length of said left side, and said right side;

an armrest hingeably coupled to said console housing and positionable between a raised position and a lowered position wherein a bottom surface of said armrest at least partially covers said storage compartment;

a front bin having an open position and a closed position, said front bin comprising an external sleeve configured to sit within said first indented area such that said entire external sleeve is positioned externally to said outer surface at all times and said external sleeve exterior forms a contiguous outer surface of said console housing when said front bin is in said closed position;

wherein said external sleeve may be slid forward to form a storage sleeve, said external sleeve sliding along said outer surface without penetrating said outer surface; and a rear bin having an open position and a closed position and generally sized to fit within said second indented area when in said closed position, said rear bin comprising a tapered rear bin left side, a tapered rear bin right side, a rear bin back side, a rear bin interior, and a substantially uniform rear bin common edge, wherein said interior of said rear bin is shaped such that, when in said closed position, a surface of said interior contiguous with a surface of said second indented area, said surface of said interior comprises interior surfaces of said rear bin left side, said rear bin right side, and said rear bin back side, wherein said armrest rests on said substantially uniform rear bin common edge when said armrest is in said raised position and said rear bin is in said open position, wherein said rear bin common edge is generally thin such that said second indented area receives said rear bin flushly therein when said rear bin is in said closed position.

* * * * *